(12) United States Patent
Poplawski et al.

(10) Patent No.: US 9,159,017 B2
(45) Date of Patent: Oct. 13, 2015

(54) PASSIVE, METAL MOUNT, UHF, RFID TAG CAPABLE OF A LONG READ RANGE

(71) Applicant: WILLIAM FRICK AND COMPANY, Libertyville, IL (US)

(72) Inventors: John Poplawski, Hawthorn Woods, IL (US); Benn Stutrud, St. Paul, MN (US)

(73) Assignee: William Frick and Company, Libertyville, IL (US)

( * ) Notice: Subject to any disclaimer, the term of this patent is extended or adjusted under 35 U.S.C. 154(b) by 0 days.

(21) Appl. No.: 14/517,810

(22) Filed: Oct. 18, 2014

(65) Prior Publication Data

US 2015/0108300 A1 Apr. 23, 2015

Related U.S. Application Data

(60) Provisional application No. 61/893,025, filed on Oct. 18, 2013.

(51) Int. Cl.
 *G06K 19/077* (2006.01)
(52) U.S. Cl.
 CPC ...... *G06K 19/07758* (2013.01); *G06K 19/0776* (2013.01); *G06K 19/07771* (2013.01)
(58) Field of Classification Search
 CPC ............... G06K 19/776; G06K 19/07758
 See application file for complete search history.

(56) References Cited

U.S. PATENT DOCUMENTS

| | | | | |
|---|---|---|---|---|
| 4,840,337 A * | 6/1989 | Zaugg | ............................ | 248/115 |
| 5,644,093 A * | 7/1997 | Wright et al. | ................ | 73/866.5 |
| 5,664,749 A * | 9/1997 | Kump et al. | ............. | 248/220.22 |
| 5,695,061 A * | 12/1997 | Stompe | ......................... | 206/449 |
| 5,903,869 A * | 5/1999 | Jacobson et al. | ............... | 704/272 |
| 2008/0213135 A1* | 9/2008 | Burke et al. | ................... | 422/102 |
| 2009/0079542 A1* | 3/2009 | Heinl | ........................... | 340/10.1 |
| 2009/0128289 A1* | 5/2009 | Rossman | ..................... | 340/10.1 |
| 2013/0238238 A1* | 9/2013 | Hsuan | ........................... | 701/468 |

\* cited by examiner

*Primary Examiner* — Gary Hoge (74) *Attorney, Agent, or Firm* — Justin Lampel (57) ABSTRACT

A passive, metal mount, UHF RFID tag with a high antenna efficiency is provided. The passive, metal mount, UHF RFID tag has a first securing surface and second securing surface which are both hinged at sides of a main body of the tag and which allow the tag to be secured to flat objects, round objects having various circumferences or to objects having unusual exterior surfaces. A pressure sensitive adhesive (PSA) tape secures the tag to the object. The tag allows the main body (or "form factor") to be offset from a metallic asset which is tracked without the metallic object negatively interfering with the RFID. The metallic surface of the asset being tracked is used to activate the Patch antenna duality of the custom design inlay, thus increasing the radiation efficiency of the driven element (integrated circuit) and ultimately the read range.

4 Claims, 11 Drawing Sheets

CURRENT DISTRIBUTION FOR THE λ/4 DIPOLE WITH IC OFFSET.

FIG. 16

VOLTAGE DISTRIBUTION OF A SLOT ANTENNA WITH IC LOCATION

$$E_R = \frac{P_{radiated}}{P_{input}} = \frac{\text{power radiated}}{\text{power inputed}}$$

FIG. 19

PASSIVE, METAL MOUNT, UHF, RFID TAG CAPABLE OF A LONG READ RANGE

CROSS REFERENCE TO RELATED APPLICATIONS

The following application is based on and claims the priority benefit of U.S. provisional application Ser. No. 61/893,025 filed Oct. 18, 2013; the entire contents of which are incorporated by reference.

BACKGROUND OF THE INVENTION

A passive, metal mount, UHF RFID tag with a high antenna efficiency is provided. The passive, metal mount, UHF RFID tag has a first securing surface and second securing surface which are both hinged at sides of a main body of the tag and which allow the tag to be secured to flat objects, round objects having various circumferences or to objects having unusual exterior surfaces. A pressure sensitive adhesive (PSA) tape is located on the bottom of the first and second securing surfaces and secures the tag to the object. The tag allows the form factor to be offset from a metallic asset which is tracked without the metallic object negatively interfering with the RFID. The antenna design and main body (or "form factor") is especially suitable for high radiation efficiency on metallic assets. The increased efficiency translates to long read distances from the interrogator to the tag, sometimes in excess of sixty feet. The antenna design incorporates multiple antenna dualities to maximize read performance, including Dipole antenna, Vivaldi antenna and Patch antenna. The metallic surface of the asset being tracked is used to activate the Patch antenna duality of the custom design inlay, thus increasing the radiation efficiency of the driven element (integrated circuit) and ultimately the read range.

Attempts have been made to provide improved means for attaching an RFID tag to an asset. For example, U.S. Pat. No. 7,859,416 to Tuttle discloses methods and systems for attaching a RFID tag to an object. At least some of the illustrative embodiments are systems comprising a substrate having a pendant portion and an attachment portion, a radio frequency identification (RFID) circuit disposed on the substrate, and a tag antenna coupled to the RFID circuit and disposed on the substrate. The attachment portion of the substrate is configured to couple to an object and the pendant portion is configured to extend away from the object.

U.S. Patent Publication No.: 20090015377 to Fogg discloses a RFID tag or label comprising a RFID tag module (comprising an electronic identification circuit and a coupling means) and an antenna structure coupled to the coupling means. The RFID tag module is separate from, separable or arranged to be severable from, the antenna structure. The tag module can be placed in or on an object and the antenna structure in or on packaging material for use with the object. A patch antenna type RFID tag antenna structure has a ground plane spaced from the patch antenna so as to increase the range of the tag. The ground plane is not substantially larger than, and electrically insulated from, the patch antenna. The ground plane is flexible, so the RFID tag structure can be worn by a human, and can be incorporated into a piece of clothing. A RFID antenna structure for use with a tag reader is made flat and robust so that it can be mounted on the ground to be walked upon or driven over. A bi-directional YAGI type RFID tag antenna structure has director elements on two opposite sides so that the YAGI antenna radiates in two opposite directions. An object includes a gain increasing metallic structure for increasing the gain of a RFID tag when placed near the object so as to form a RFID tag antenna structure.

Publication No.: 2002/0044096 to Chung discloses an antenna array having a plurality of antenna loops disposed to define a portal or passageway or other detection region in which the plural antenna loops transmit and/or receive electromagnetic signals. A processor coupled to the plural antenna loops processes at least the received signals and/or transmitted signals. The plural antennas may be arrayed in a rectangular array, on hanging flexible substrates or other suitable arrangement, and may be coupled to the processor by a filter or selective switch. The processor may be coupled to a utilization system for cooperating therewith for performing a desired function.

Still further, U.S. Pat. No. 6,362,786 to Asano discloses a patch antenna utilized in conjunction with an electronic apparatus, such as a notebook personal computer. The patch antenna includes a patch, a ground plate, and a dielectric plate. The dielectric plate is formed between the patch and the ground plate. Specifically, the dielectric plate is formed by a wall portion of a chassis of an electronic apparatus located between the patch and the ground plate such that the patch antenna is formed integrally with the chassis of the electronic apparatus.

However, these patents and publications fail to disclose an adjustable RFID tag metal mount which obtains extended read range while used on a metallic asset. Accordingly, a need exists for an improved adjustable RFID tag metal mount having an extended read range for use on a metallic asset.

SUMMARY OF THE INVENTION

A passive, metal mount, UHF RFID tag with a high antenna efficiency is provided. The passive, metal mount, UHF RFID tag has a first securing surface and second securing surface which are both hinged at sides of a main body of the tag and which allow the tag to be secured to flat objects, round objects having various circumferences or to objects having unusual exterior surfaces. A pressure sensitive adhesive (PSA) tape is located on the bottom of the first and second securing surfaces and secures the tag to the object. The tag allows the form factor to be offset from a metallic asset which is tracked without the metallic object negatively interfering with the RFID. The antenna design and main body (or "form factor") is especially suitable for high radiation efficiency on metallic assets. The increased efficiency translates to long read distances from the interrogator to the tag, sometimes in excess of sixty feet. The antenna design incorporates multiple antenna dualities to maximize read performance, including Dipole antenna, Vivaldi antenna and Patch antenna. The metallic surface of the asset being tracked is used to activate the Patch antenna duality of the custom design inlay, thus increasing the radiation efficiency of the driven element (integrated circuit) and ultimately the read range.

An advantage of the present metal mount RFID tag is that the present metal mount RFID tag is adjustable so as to be able to be secured to objects having various surfaces.

Another advantage of the present metal mount RFID tag is that the present metal mount RFID tag may allow for an increased read range.

And another advantage of the present metal mount RFID tag is that the present device may have a casing which may seal and protect a custom design RFID inlay of the tag from exposure to the outside elements. In an embodiment, the device may have an IP67 IP Code specification.

An advantage of the present metal mount RFID tag is that the present metal mount RFID tag may be a passive tag.

A still further advantage of the present metal mount RFID tag is that the present metal mount RFID tag may increase the safety of workers taking readings by allowing an increased read range (for example, eliminating the need to climb a pole to take a reading).

Still another advantage of the present metal mount RFID tag is that the present device may increase the efficiency of workers by speeding up the reading time of the tags.

Another advantage of the present metal mount RFID tag is that the present metal mount RFID tag allows for maximizing the mounting options of an RFID tag.

Yet another advantage of the present metal mount RFID tag is that the present metal mount RFID tag may increase efficiency in that multiple RFIDs may be read from a greater distance.

Still another advantage of the present metal mount RFID tag is that the present device may be used to seal an RFID inlay with a sonic weld or injection mold.

Another advantage of the present metal mount RFID tag is that the present device may have a flexible self-adjusting living hinge PSA tape base mounting system which allows the RFID tag to be easily mounted to any surface from a flat surface to curved surfaces with varying circumferences without the need for additional tools or fasteners.

Yet another advantage of the present metal mount RFID tag is that the present metal mount RFID tag may, in different embodiments, be mounted on an asset by, for example: 1) utilizing a metallic pipe clamp to hold the form factor against a curved channel of metal; 2) securing the metal mount via screw holes; or 3) securing the metal mount to the metal asset by applying adhesive to the back of the metal mount.

For a more complete understanding of the above listed features and advantages of the metal mount RFID tag having an extended read range when used on metallic assets, reference should be made to the following detailed description of the preferred embodiments and to the accompanying drawings.

DETAILED DESCRIPTION OF THE PREFERRED EMBODIMENTS

A passive, metal mount, UHF RFID tag with a high antenna efficiency is provided. The passive, metal mount, UHF RFID tag has a first securing surface and second securing surface which are both hinged at sides of a main body of the tag and which allow the tag to be secured to flat objects, round objects having various circumferences or to objects having unusual exterior surfaces. A pressure sensitive adhesive (PSA) tape is located on the bottom of the first and second securing surfaces and secures the tag to the object. The tag allows the form factor to be offset from a metallic asset which is tracked without the metallic object negatively interfering with the RFID. The antenna design and main body (or "form factor") is especially suitable for high radiation efficiency on metallic assets. The increased efficiency translates to long read distances from the interrogator to the tag, sometimes in excess of sixty feet. The antenna design incorporates multiple antenna dualities to maximize read performance, including Dipole antenna, Vivaldi antenna and Patch antenna. The metallic surface of the asset being tracked is used to activate the Patch antenna duality of the custom design inlay, thus increasing the radiation efficiency of the driven element (integrated circuit) and ultimately the read range.

Figure 6:
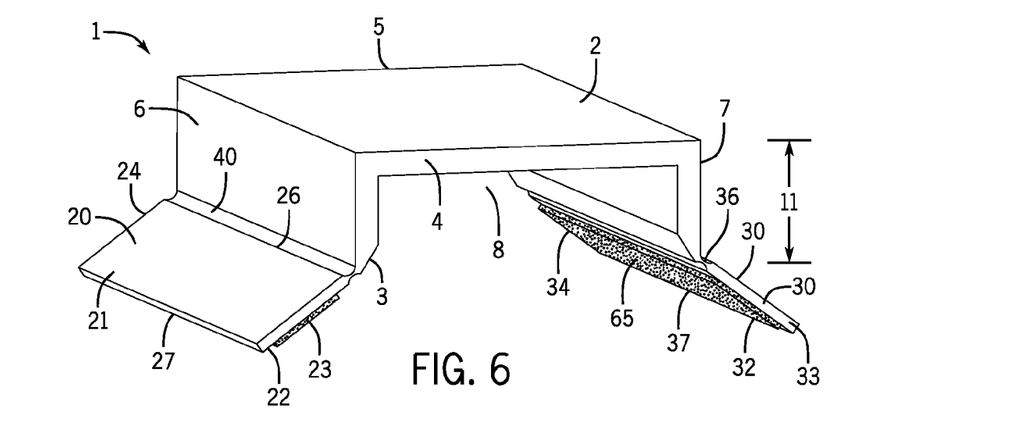
FIG. 6 illustrates a perspective side view of the first embodiment of the RFID tag wherein the first and second securing surfaces are in a non-parallel orientation (for securing to a round object).
Figure 7:
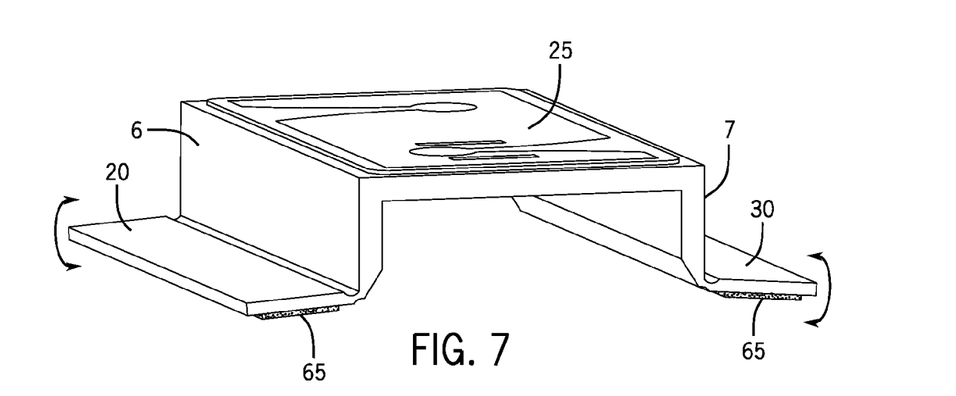
FIG. 7 illustrates a perspective side view of the first embodiment of the RFID tag wherein the first and second securing surfaces are in a generally parallel orientation (for securing to a flat object or prior to the device being inserted onto a round object).
Figure 14:
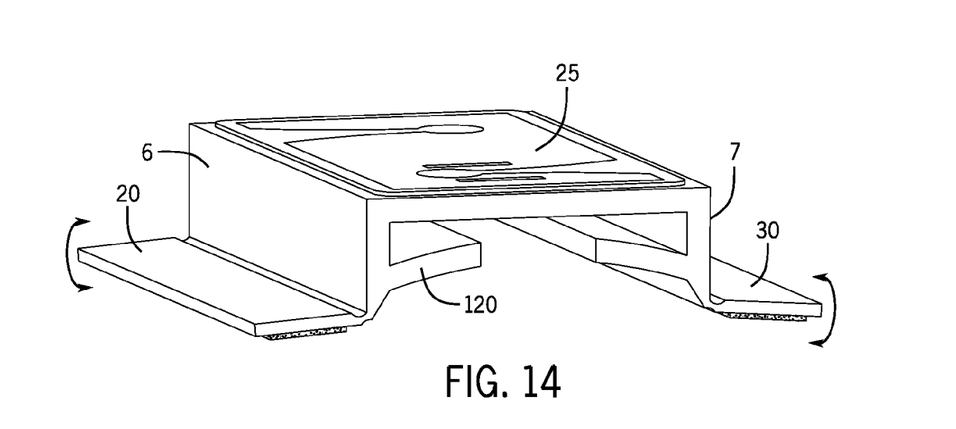
FIG. 14 illustrates a side perspective view of the second embodiment of the RFID tag wherein the first and second securing surfaces are in a generally parallel orientation (for securing to a flat object or prior to the device being inserted onto a round object).
Figure 15:
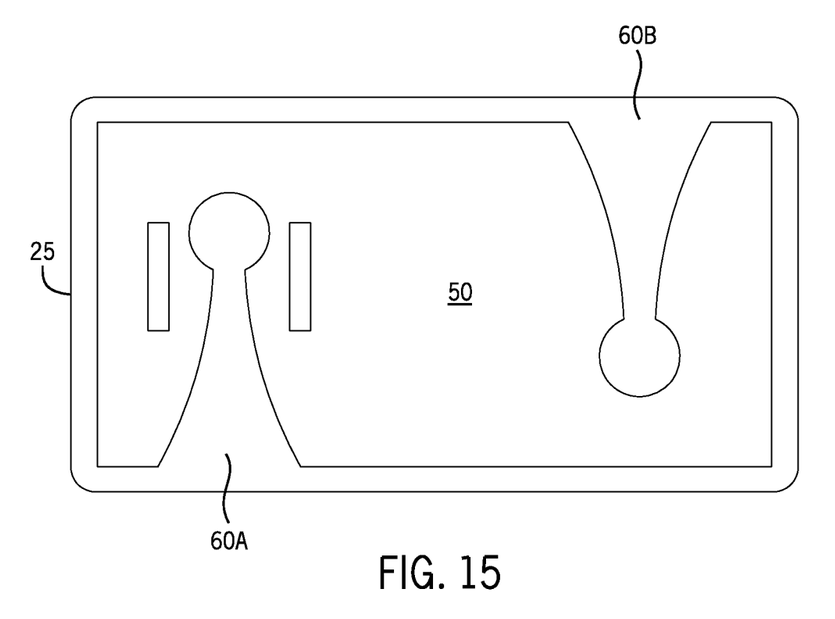
FIG. 15 illustrates an embodiment of a custom design inlay antenna for the metal mount RFID tag.

Referring first to FIG. 6, a metal mount RFID tag 1 is provided. The metal mount RFID tag 1 may be used in connection with a standard inlay 25 or a custom design inlay (FIG. 15 illustrates a custom design inlay). The inlay 25 may be secured to a top 2 of the RFID tag 1 as is illustrated in FIGS. 7 and 14. In addition to the top 2, the RFID tag 1 may have a main body having a bottom 3, a front 4, a back 5, a first side 6, a second side 7, and a generally hollow interior 8. The first side 6 and the second side 7 may have a height 11 wherein the height 11 allows the inlay 25 to be off-set from an object 50 (FIG. 1) being tracked. In an embodiment, the height 11 is preferably one inch so as to provide an optimal read range. It should be understood that although the present device 1 is especially suitable for use in connection a metal object 50 to be tracked, the present RFID tag 1 may be secured to and used with any object.

The front 4 and the back 5 may be generally open creating a passageway underneath the top 2 of the RFID tag 1. Preferably, the front 4 and the back 5 may be generally open so that the device 1 may be easily secured to an object 50 (FIG. 1) having a curved or otherwise uneven surface. More specifically, if the front 4 and the back 5 extended the full distance of the height 11 of the first side 6 and the second side 7 (so as to form a generally uniform height along the front, back, first side and second side) then the device 1 would not be able to be secured to a generally cylindrical object 50 in a flush manner.

The main body (or "form factor") of the RFID tag 1 is preferably made from a plastic, rubber or other material which does not interfere with electrical signals. In particular, the device 1 is especially suitable for securing the inlay 25 to a metal object 50 in a manner which does not cause the metal of the object 50 to interfere with the electrical components (for example, the antenna) of the inlay 25 (FIG. 15) of the RFID tag 1. In particular, the present RFID tag 1 allows the inlay 25 of the device 1 to be secured in an off-set manner from the object 50.

In an embodiment, the device 1 may have a first securing surface 20 and a second securing surface 30. In an embodiment, the first securing surface 20 and second securing surface 30 are both generally rectangular. The second securing surface 30 may mirror the first securing surface 20 in both features and function. The first securing surface 20 may be secured to the first side 6 of the device 1 (at the bottom 3 of the device 1) whereas the second securing surface 30 may be secured to the second side 7 of the device 1 (at the bottom 3 of the device 1). The first securing surface 20 may have a top 21, a bottom 22, a front 23, a back 24, a first side 27 and a second side 26. The second securing surface 30 may be similar to the first securing surface 20 and may have a top, a bottom 32, a front 33, a back 34, a first side 37 and a second side 36.

The second side 26 of the first securing surface 20 may be permanently secured to the first side 6 of the main body of the device 1 by an extended hinge portion 40 wherein the extended hinge portion 40 allows the first securing surface 20 to rotate approximately two hundred and seventy degrees with respect to the first side 6. Although the first securing surface 20 may rotate approximately two hundred and seventy degrees with respect to the first side 6, it should be noted that in practice, the first securing surface 20 usually only rotates less than ninety degrees as the device 1 is often secured to standard curved surfaces. FIG. 7 illustrates the first securing surface 20 rotating from a First Position wherein the first securing surface 20 is in a generally parallel orientation with respect to the top 2 of the device 1 to a Second Position (FIG. 6) wherein the first securing surface 20 is at an angle of approximately forty-five degrees with respect to the top 2 of the device 1. This Second Position is suitable for securing the device 1 to a round object. In an embodiment, the extended hinge portion 40 of the first side 6 and the extended hinge portion 40 of the second side 7 may rotate are independently and at different angles when the device 1 is secured to an object 50 having a non-uniform or unusual exterior.

Figure 5:
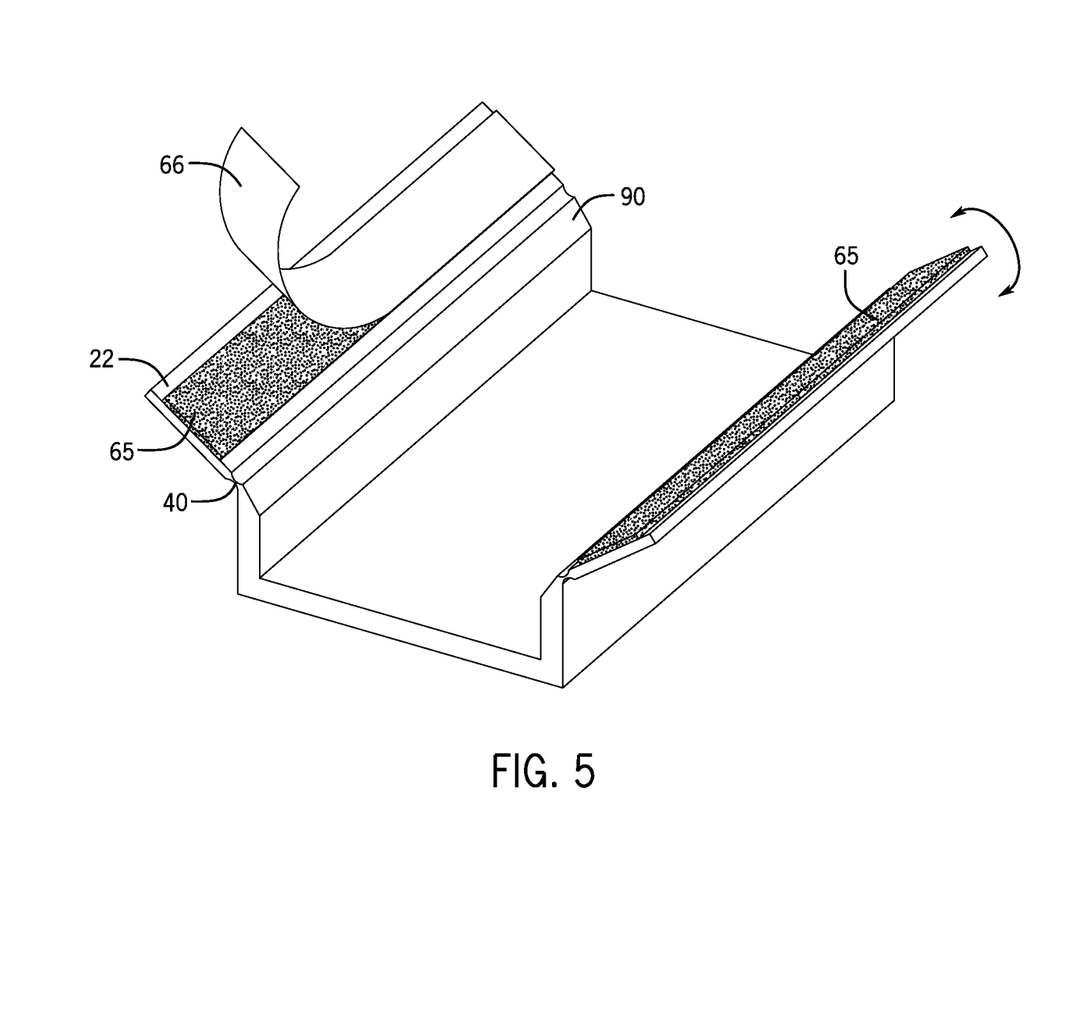
FIG. 5 illustrates a perspective view of the bottom of the first embodiment of the RFID tag wherein a protective covering is being removed exposing an adhesive.

Referring now to FIG. 5, located on the bottom 22 of the first securing surface 20 (and second securing surface 30) may be a generally adhesive material 65. The adhesive material 65 may be a pressure sensitive adhesive (PSA) tape having a removable cover 66. The removable cover 66 may temporarily prevent the generally adhesive material 65 from contacting and being inadvertently secured to the wrong object and may prevent the generally adhesive material 65 from losing strength. To install the device 1 on an object 50 to track the object 50, the two removable covers 66 are removed from the adhesive materials 65 and the device 1 and the first securing surface 20 and the second securing surface 30 are then pressed against the metal object 50 making sure that the adhesive material 65 of both the first securing surface 20 and the second securing surface 30 fully contact and remain flush with the exterior of the object 50. The extended hinges 40 of the device 1 allow the first securing surface 20 and the second securing surface 30 to rotate with respect to the main body of the device 1 so as to allow the first securing surface 20 and second securing surface 30 to contact and remain flush with the exterior of the object 50 regardless of the shape of the exterior of the object 50.

Figure 3:
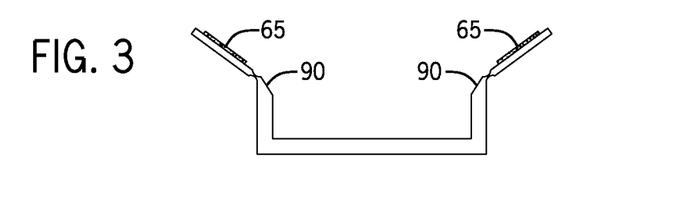
FIG. 3 illustrates a side view (inverted) of the first embodiment of the RFID tag.

In an embodiment, the device may have a tapered portion 90 (FIG. 3). The tapered portion 90 may be located on the bottom 3 of the main body at the extended hinge portion 40. The tapered portion 90 may taper inward, toward the center of the main body and may allow the bottom 3 of the device 1 to more easily be secured to the object 50 in a flush manner.

Figure 8:
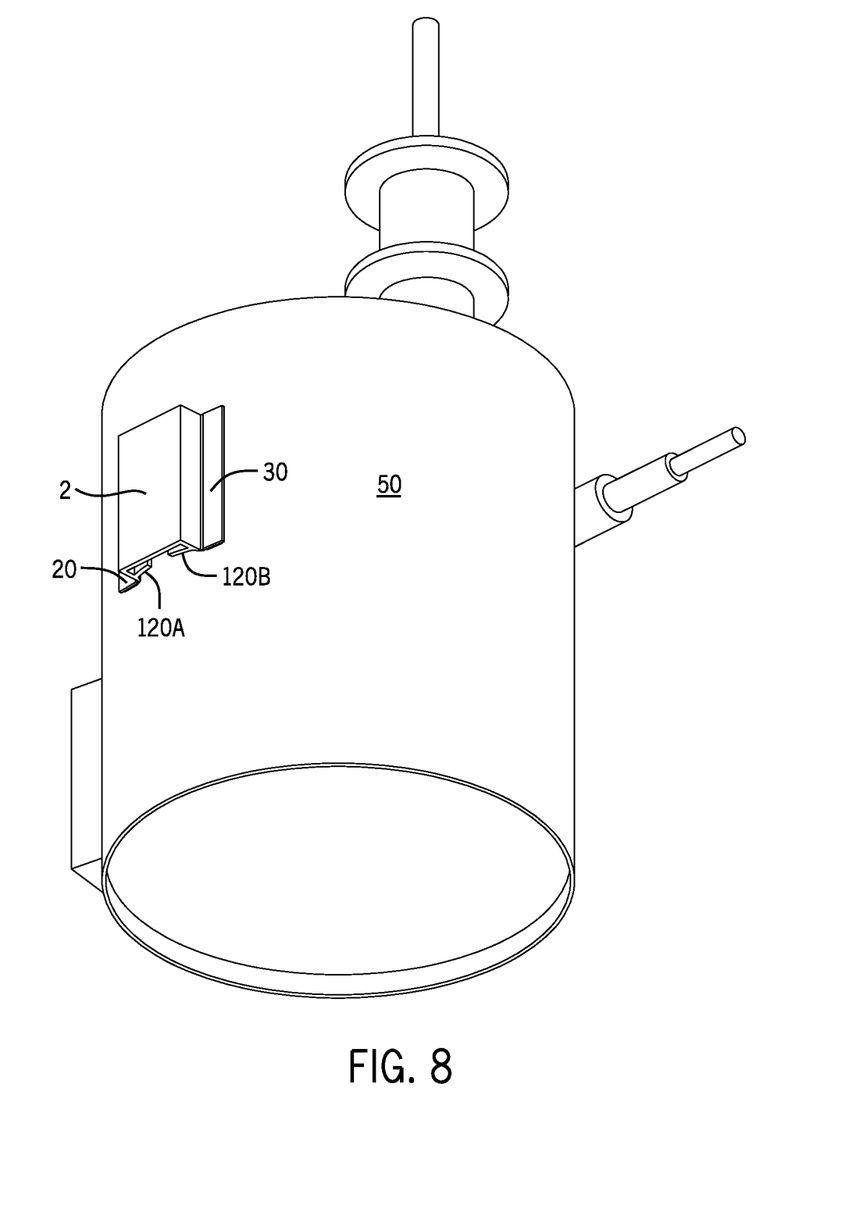
FIG. 8 illustrates a perspective view of the second embodiment of the RFID tag of the present application secured to a metal object.
Figure 9:
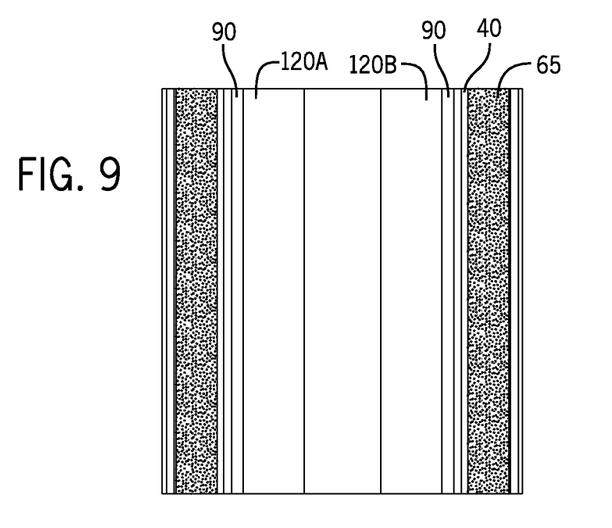
FIG. 9 illustrates a bottom view of the second embodiment of the RFID tag.
Figure 10:
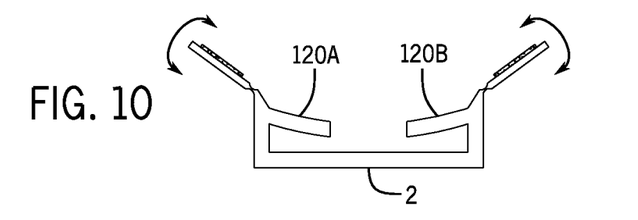
FIG. 10 illustrates a side view (inverted) of the second embodiment of the RFID tag wherein the first and second securing surfaces are in a non-parallel orientation.
Figure 11:
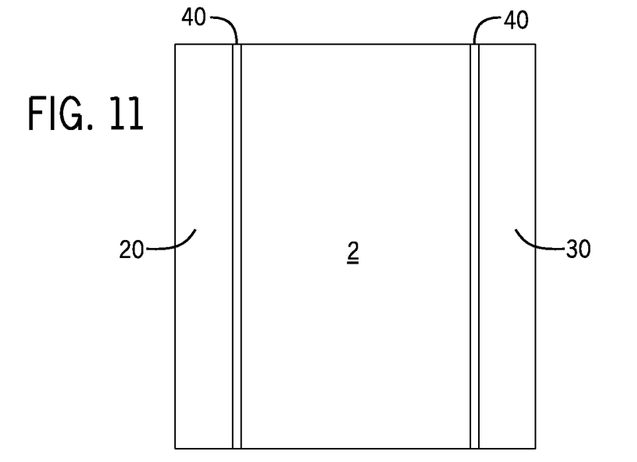
FIG. 11 illustrates a top view of the second embodiment of the RFID tag.
Figure 12:
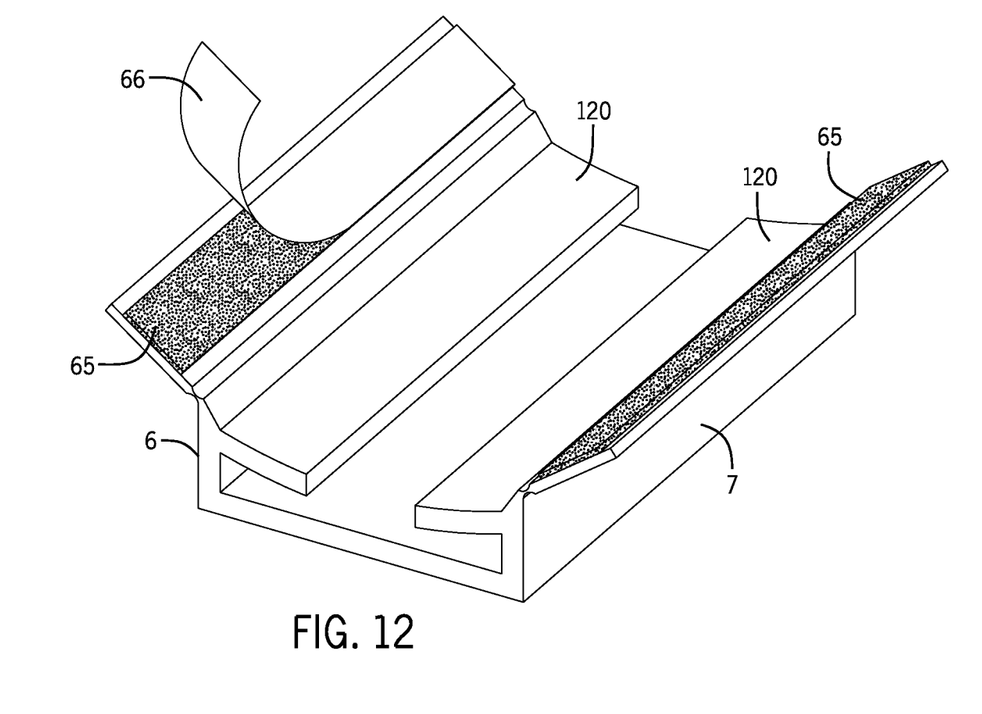
FIG. 12 illustrates a bottom perspective view of the second embodiment of the RFID tag wherein the protective covering is being removed.
Figure 13:
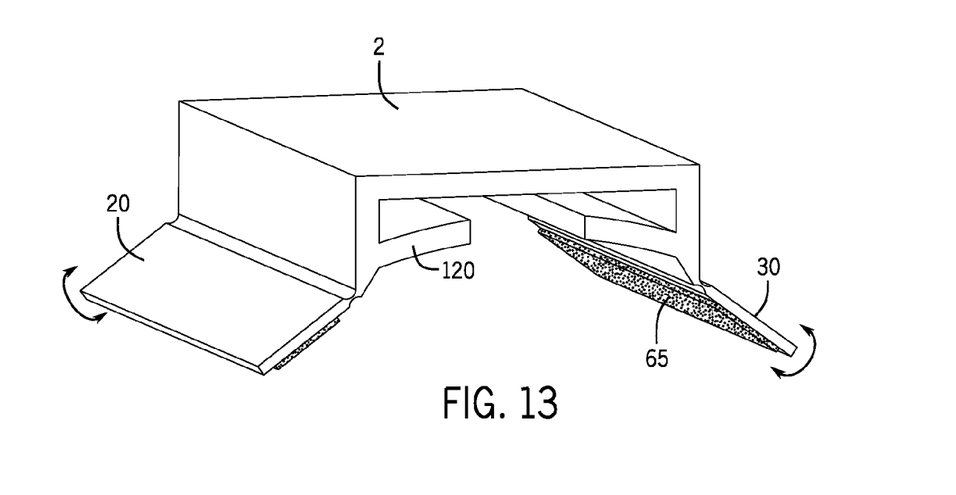
FIG. 13 illustrates a side perspective view of the second embodiment of the RFID tag wherein the first and second securing surfaces are in a non-parallel orientation (for securing to a round object).

Referring now to FIGS. 8-14, in an alternative embodiment, the device 1 may have an additional first inwardly extending ledge 120A and an additional second inwardly extending ledge 120B. The first and second inwardly extending ledges 120 may extend inward toward the center of the main body of the device 1 whereas the first securing surface 20 and the second securing surface 30 extend in a generally opposite direction (away from the main body of the device 1). In an embodiment, the first inwardly extending ledge 120A and the second inwardly extending ledge 120B have a curvature substantially similar to a curvature of the metal object 50 so as to provide greater support to the top 2 of the device 1 if/when the top 2 of the device 1 is pressed downward toward the metal object 50. In particular, the similar curvature of the first and the second inwardly extended ledges 120A, 120B create a greater surface area of contact with the metal object 50 therein reducing the stress on the device 1. As shown in FIGS. 8 and 14, in an embodiment, the first inwardly extending ledge 120A and the second inwardly extending ledge 120B may not directly contact the metal object 50 while the device 1 is at rest, but may contact the metal object 50 only if a force is applied to the top 2 of the device 1.

The first and second inwardly extending ledges 120 may be slightly curved and may help protect the device 1 when pressure is applied to the top 2 of the device 1. In particular, if a forced is applied to the top 2 of the device 1 (for example, during installation), the first and the second inwardly extending ledges 120 may be moved down (toward the bottom 3 of the device 1) and may then directly contact the surface of the object 50 and may therein provide additional support to prevent the top 2 of the device 1 from breaking or moving too close to the metal object 50. As a result, electrical interference between the metal object 50 and the electrical circuitry of the inlay 25 is prevented.

Figure 4:
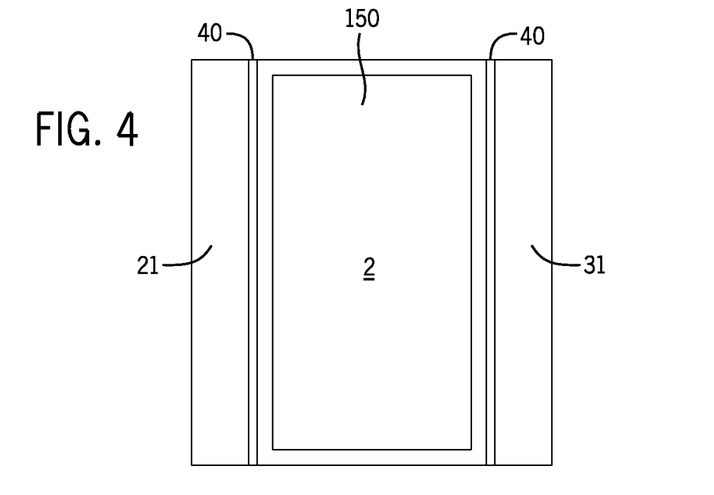
FIG. 4 illustrates a top view of the first embodiment of the RFID tag.

Referring now to FIG. 15, as stated above, in an embodiment, located on the top 2 of the main body of the device 1 may be the inlay 25. Preferably, the inlay 25 occupies most (if not all) of the top 2 of the main body of the device 1 so as to increase efficiency. The inlay 25 may be protected from damage caused by exposure to the outside elements by being covered in a plastic covering 150 (FIG. 4).

Preferably, the inlay 25 may have a conductive material portion 500 and a first Vivaldi slot antenna portion 60A and a second Vivaldi antenna portion 60B all of which are secured to the top 2 of the main body of the device 1 (the "form factor"). In an embodiment, the first Vivaldi antenna portion 60A and the second Vivaldi antenna portion 60B are identical, but located on different sides of the inlay 25 and located in an inverted orientation with respect to each other. In an embodiment, the inlay 25 may be placed between two injection molded parts of the form on top 2 of the device 1 and a sonic weld may be used to seal the inlay 25. This process may create an IP67 enclosure wherein the antenna is tuned for plastic.

Figure 16:
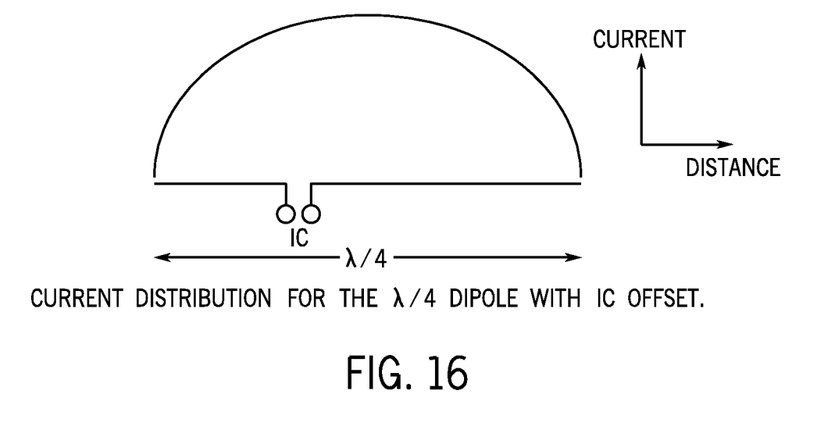
FIG. 16 illustrates the relative current distribution of a $\lambda/4$ antenna with the IC.

Although different inlays 25 may be used in connection with the main body of the device 1, the specific custom design inlay of FIG. 15 incorporates multiple resonances to maximize read performance. The custom design inlay 25 of FIG. 15 has a general dipole design and a length of approximately three inches. The three inches of the length of the antenna is approximately equal to a quarter dipole antenna ($\lambda/4$). FIG. 16 illustrates the relative current distribution of a $\lambda/4$ antenna with the IC offset similar to that in FIG. 15. As a result of the current being additive, the electrical field adds up around the IC.

Figure 17:
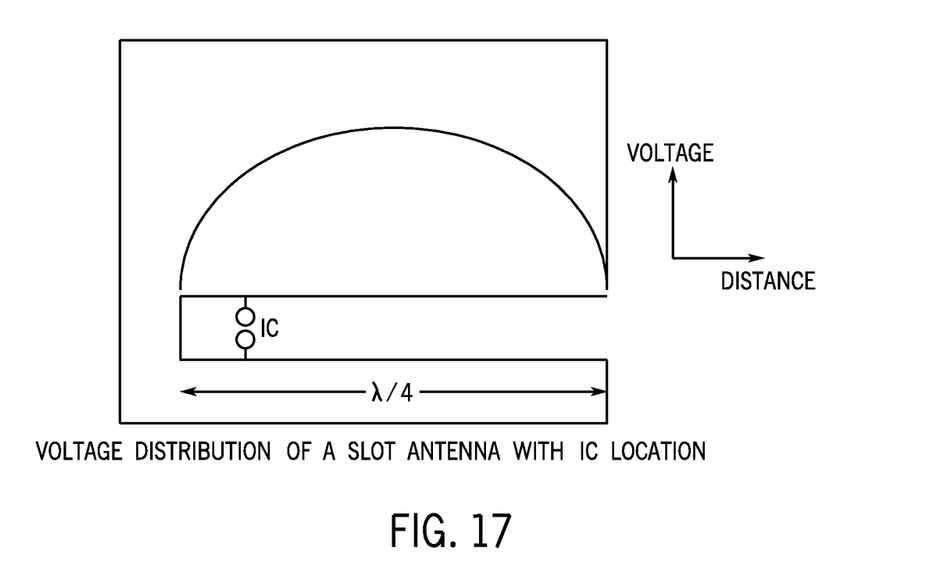
FIG. 17 illustrates plots the voltage versus distance for a slot antenna.

The Vivaldi antenna portion 60A, 60B of the custom designed inlay 25 of FIG. 15 may be considered a tapered slot antenna. The shape of the Vivaldi antenna is shown in FIG. 15 as one of the two illustrated slots. Unlike the dipole antennas, slot antennas radiate due to additive voltage (not additive current). The slot antennas shown in FIG. 15 are approximately $\lambda/4$ in length. FIG. 17 plots the voltage versus distance for a slot antenna. The IC is placed towards the end of the slot for impedance matching (i.e.: improving efficiency). The voltage's associated electric field adds to the Alien Sit's IC.

Figure 18:
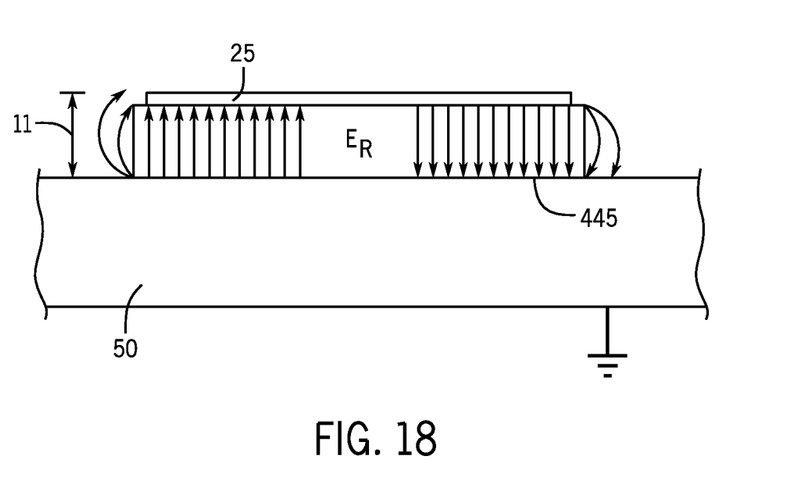
FIG. 18 illustrates the cross-sectional schematic of the device offset from the metal asset.

Referring now to FIG. 18, the cross-sectional schematic of the device 1 having the custom design inlay 25 of FIG. 15 off-set from the surface 445 of a metal asset 50 is illustrated. Another factor which contributes to the strength of the custom design inlay 25 of FIG. 15 is the strength of the electric field which arises from the tag being a patch antenna. FIG. 18 shows a cross-sectional schematic of the patch antenna receiving a signal at an instantaneous moment. In this schematic, the resulting electrical fields (E-fields) are shown between the induced charge on the antenna and the grounded metallic substrate. Notably, most of the E-Fields cancel each other out, except for the fringing E-fields along the edges of the antenna. These fields are constructive and add to the efficiency of the custom design inlay 25.

Figure 19:
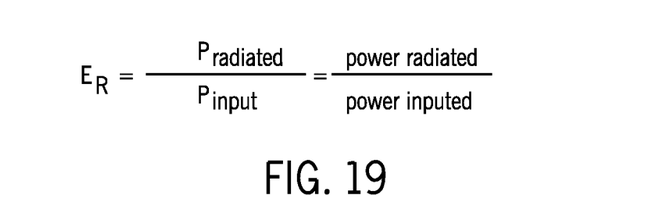
FIG. 19 illustrates the long read range is the result of the antenna design.

Referring now to FIG. 19, the long read range is the result of the custom design inlay 25 having a high efficiency wherein=

$$\varepsilon_R = \frac{P_{radiated}}{P_{input}} = \frac{\text{power radiated}}{\text{power inputed}}$$

Figure 1:
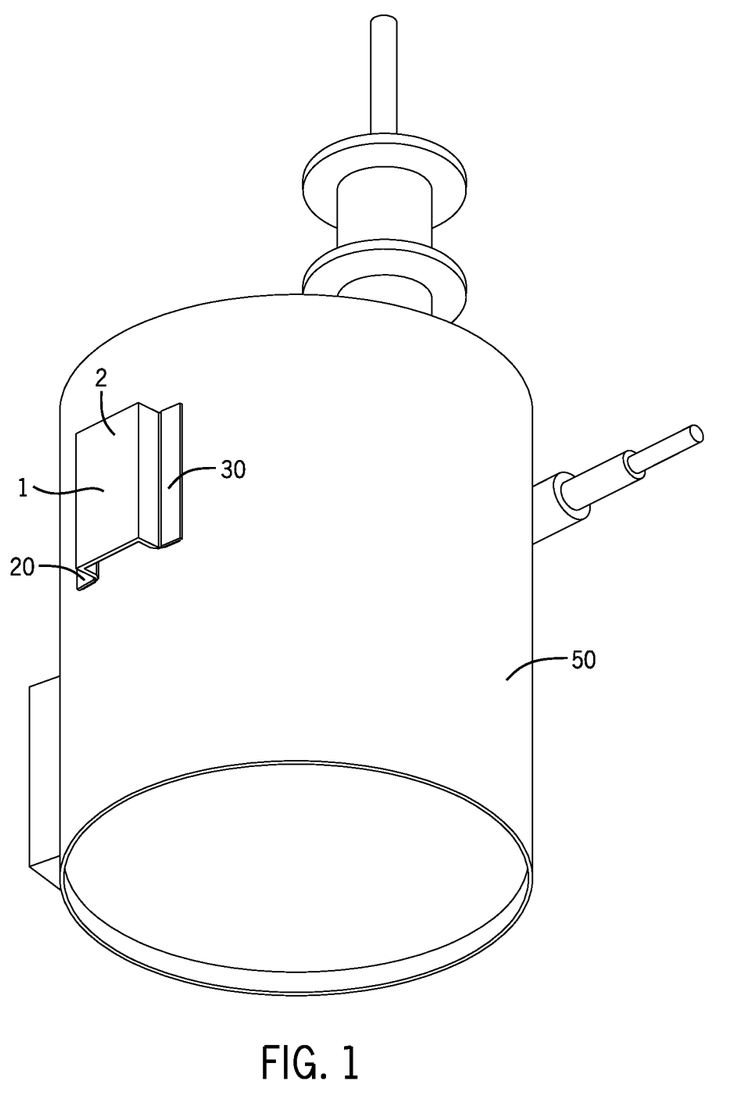
FIG. 1 illustrates a perspective view of the metal mount RFID tag of the present application secured to a metal object.
Figure 2:
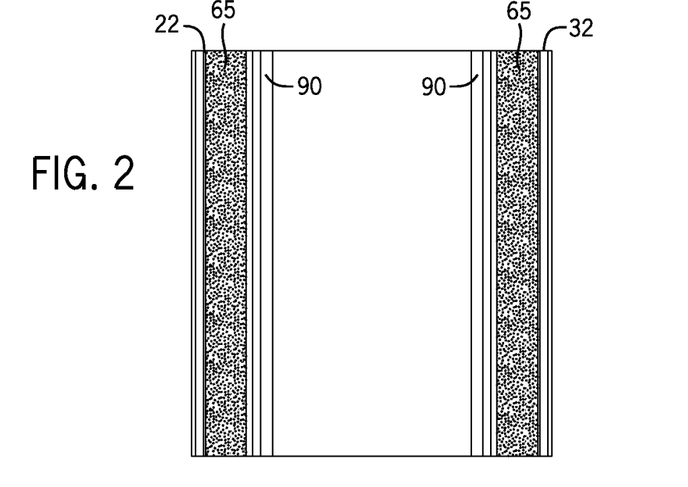
FIG. 2 illustrates a bottom view of the first embodiment of the RFID tag.

In an embodiment, the metal mount RFID tag 1 may be secured to a metal asset 50 (FIGS. 1 and 8). The device 1 is especially suitable for use in connection with metal assets 50 such as, for example, metal transformers, metal cargo containers, I-beams, large metallic construction assets, large refillable chemical tanks, military vehicles, scaffolds, large wire reels and light poles, farm equipment, metal returnable bins, rail cars, generators, metal pedestals, mining vehicles, mining equipment, refinery components, barges, ships; most of which have plenty of room for the present device 1. Further, the present device 1 is especially suitable for use in connection with utility poles which often require a read range of thirty to fifty feet. The high read range of the present device 1 allows for the custom design inlay 25 of FIG. 15 to be scanned and read from the ground. Having a long read range custom design inlay 25 may improve efficiency and safety. For example, the long read range may allow a technician to read the custom design inlay 25 of FIG. 15 without needing to climb a dangerous utility pole.

Off-setting the metal mount custom design inlay 25 from the metal asset 50 results in a producing a high gain read range as a result of the electrical wave combination of the custom design inlay 25 with the metal surface of the metal asset 50. The custom design inlay 25 of FIG. 15 may be offset from the metal asset 50 by, for example, approximately one inch. The main body may be, for example, a sonic weld of multiple parts or injection molded as one solid unit. In an embodiment, the main body is plastic; wherein the speed of light through the plastic is taken into consideration. The material of the main body has no effect of the custom design inlay 25 performance. As stated above, in an embodiment, the first side 6 and second side 7 of the device 1 may have a height 11. As stated above, the height 11 is preferably approximately one inch so that the custom design inlay 25 may optimally interact with a metal surface of the metal asset 50.

Although embodiments of the present invention are shown and described therein, it should be understood that various changes and modifications to the presently preferred embodiments will be apparent to those skilled in the art. Such changes and modifications may be made without departing from the spirit and scope of the present invention and without diminishing its attendant advantages. It is, therefore, intended that such changes and modifications be covered by the present application.

We claim:

1. An RFID mount for securing to a metal object, the RFID mount comprising:
   a housing have a top, a bottom, a front, a back, a first side, a second side and an interior portion wherein the first side and the second side have a length and wherein the distance from the top of the housing to the bottom of the housing defines a height;
   a first extended planar surface having a bottom and extending from the first side of the housing at the bottom of the housing wherein the first extended planar surface is secured at a first hinge and wherein the first hinge allows the first extended planar surface to rotate approximately two hundred and seventy degrees with respect to the first side of the housing;
   a second extended planar surface having a bottom and extending from the second side of the housing at the bottom of the housing wherein the second extended planar surface is secured at a second hinge and wherein the second hinge allows the second extended planar to rotate approximately two hundred and seventy degrees with respect to the second side of the housing;
   wherein the first extended planar surface is rotated with respect to the top of the housing so as to allow the first extended planar surface to contact the metal object in a substantially flush manner while the top housing is rotated toward the metal object and wherein the first extended planar surface and the top of the housing are in a non-parallel orientation;
   an RFID chip located on the top of the housing; and
   a first extended ledge extending inward toward the interior portion of the housing wherein the first extended ledge is attached to and extends in an opposite direction as the first extended planar surface and wherein the first extended ledge is on the opposite side of the first side of the housing as the first extended planar surface.

2. The RFID mount for securing to a metal object of claim 1 wherein the first extended ledge is curved.

3. An RFID mount for securing to a metal object, the RFID mount comprising:
- a housing have a top, a bottom, a front, a back, a first side, a second side and an interior portion wherein the first side and the second side have a length and wherein the distance from the top of the housing to the bottom of the housing defines a height;
- a first extended planar surface having a bottom and extending from the first side of the housing at the bottom of the housing wherein the first extended planar surface is secured at a first hinge and wherein the first hinge allows the first extended planar surface to rotate approximately two hundred and seventy degrees with respect to the first side of the housing;
- a second extended planar surface having a bottom and extending from the second side of the housing at the bottom of the housing wherein the second extended planar surface is secured at a second hinge and wherein the second hinge allows the second extended planar to rotate approximately two hundred and seventy degrees with respect to the second side of the housing;
- wherein the first extended planar surface is rotated with respect to the top of the housing so as to allow the first extended planar surface to contact the metal object in a substantially flush manner while the top housing is rotated toward the metal object and wherein the first extended planar surface and the top of the housing are in a non-parallel orientation;
- an RFID chip located on the top of the housing;
- a first extended ledge extending inward toward the interior portion of the housing wherein the first extended ledge is attached to and extends in an opposite direction as the first extended planar surface and wherein the first extended ledge is on the opposite side of the first side of the housing as the first extended planar surface;
- wherein the first extended ledge is curved; and
- wherein the curvature of the first extended ledge substantially matches the curvature of an exterior of the metal object.

4. An RFID mount for securing to a metal object, the RFID mount comprising:
- a housing have a top, a bottom, a front, a back, a first side, a second side and an interior portion wherein the first side and the second side have a length and wherein the distance from the top of the housing to the bottom of the housing defines a height;
- a first extended planar surface having a bottom and extending from the first side of the housing at the bottom of the housing wherein the first extended planar surface is secured at a first hinge and wherein the first hinge allows the first extended planar surface to rotate approximately two hundred and seventy degrees with respect to the first side of the housing;
- a second extended planar surface having a bottom and extending from the second side of the housing at the bottom of the housing wherein the second extended planar surface is secured at a second hinge and wherein the second hinge allows the second extended planar to rotate approximately two hundred and seventy degrees with respect to the second side of the housing;
- wherein the first extended planar surface is rotated with respect to the top of the housing so as to allow the first extended planar surface to contact the metal object in a substantially flush manner while the top housing is rotated toward the metal object and wherein the first extended planar surface and the top of the housing are in a non-parallel orientation;
- an RFID chip located on the top of the housing; and
- wherein the first extended ledge contacts an exterior of the metal object when a force is applied to the top of the housing and wherein the first extended ledge provides structural support to the top of the housing and prevents the top of the housing from breaking or coming too close to the metal object so as to allow the metal object to electrically interfere with the RFID chip.

* * * * *